United States Patent [19]

Brenner et al.

[11] Patent Number: 4,661,885

[45] Date of Patent: Apr. 28, 1987

[54] LOCKABLE LAMPHOLDER MOUNTING SYSTEM

[75] Inventors: Stanley S. Brenner, Massapequa; Charles Chase, East Meadow, both of N.Y.

[73] Assignee: Leviton Manufacturing Company, Inc., Little Neck, N.Y.

[21] Appl. No.: 774,103

[22] Filed: Sep. 11, 1985

[51] Int. Cl.[4] .............................................. H02B 1/04
[52] U.S. Cl. .................................. 361/346; 248/27.3; 362/448; 339/125 L; 361/419
[58] Field of Search ..................... 362/95, 439, 448; 361/417, 419, 420, 331, 423, 355, 426–428, 346, 400, 413; 339/125 R, 125 L; 248/224.4, 225.1, 27.1, 27.3; 200/296

[56] References Cited

U.S. PATENT DOCUMENTS

| 3,332,648 | 7/1967 | Selinder | 248/27.3 |
| 3,599,174 | 8/1971 | Dhaliwal | 339/125 R |
| 3,604,919 | 9/1971 | MacPherson | 339/125 L |
| 3,881,676 | 5/1975 | Reinwall | 248/224.4 |
| 4,124,267 | 11/1978 | Mines | 339/125 R |
| 4,541,036 | 9/1985 | Landries | 248/27.3 |

Primary Examiner—G. P. Tolin
Attorney, Agent, or Firm—Paul J. Sutton

[57] ABSTRACT

The present invention teaches a lockable lampholder mounting system wherein a housing containing electrical contacts, such as an electrical wiring device of the type exemplified by an incandescent lampholder or socket, is removably mounted upon a preselected panel by means of a novel clip arrangement. The panel is of the type utilized in a fixture, for example. The clip arrangement includes a resilient clip of predetermined shape formed with at least three bearing surfaces for contacting the panel, and preferably a fourth bearing surface against which a locking tab is biased to prevent rotation and relatively upward movement of the wiring device.

4 Claims, 6 Drawing Figures

LOCKABLE LAMPHOLDER MOUNTING SYSTEM

FIELD OF THE INVENTION

The present invention features a lampholder assembly for use as a wiring device, and more particularly a lockable lampholder mounting system that may be easily and removably mounted to a panel that will accommodate a variety of sockets.

BACKGROUND OF THE INVENTION

It has been customary in assembling fixtures with a plurality of sockets capable of accepting bulbs or lamps to utilize rivets to secure the sockets to a mounting panel forming part of the fixture. This procedure is costly both in time and money, and requires a level of workforce labor that reflects itself in both time and money as well.

A need has existed for a relatively simple but effective and efficient method and apparatus for mounting such sockets in this and other environments in a manner that will enable their assembly in reduced time, with reduced expense, and at the same time in a manner that may at the option of the user enable their rapid removal where appropriate.

The present invention seeks to meet this challenge and to overcome objections and limitations associated with conventional mounting systems of the type alluded to by providing a lockable lampholder mounting system capable of use with any one of a variety of wiring devices, not simply sockets or lampholders. The invention features a design that enables a rapid and easy mounting of sockets to such a panel, providing much needed inhibiting or prevention of sliding, rotation and lifting of the socket from the panel, thereby ensuring a reliable end product.

BRIEF SUMMARY OF THE INVENTION

The present invention relates to and is thus entitled a lockable lampholder mounting system. A unique system is provided utilizing a preformed and resilient clip means secured to a socket/lampholder to be mounted to a panel or the like. An electrical wiring device assembly for use with a panel of a fixture, for example, includes a housing containing electrical contacts and electrical means interconnecting the housing with power. Clip means in the preferred form of a resilient metal clip is formed in a predetermined shape for mounting and supporting the wiring device housing to the panel mounting surfaces, and includes at least three spaced bearing surfaces which contact the panel mounting surfaces, one of said panel mounting surfaces facing a direction substantially opposite that of the others. The clip further includes a portion thereof which is secured during use to the housing.

It is an object of the present invention to provide a lockable wiring device mounting system.

It is a further object of this invention to provide a removably lockable lampholder mounting system.

A further object of this invention is to provide a mounting system that will inhibit and prevent the otherwise undesirable sliding, lifting and rotation of a wiring device, such as a lampholder, mounted to a fixture panel.

Another object of the present invention is to provide a lampholder mounting system which is less costly in time and money to manufacture and utilize in the installation of same to the panel of a fixture.

Still a further object of this invention is to provide a lockable lampholder mounting system which overcomes disadvantages of conventional mounting arrangements.

These and other objects of the invention will become more apparent and will be better understood when considered with respect to the following more detailed description read in conjunction with the accompanying drawings.

MORE DETAILED DESCRIPTION OF THE INVENTION

Figure 1:
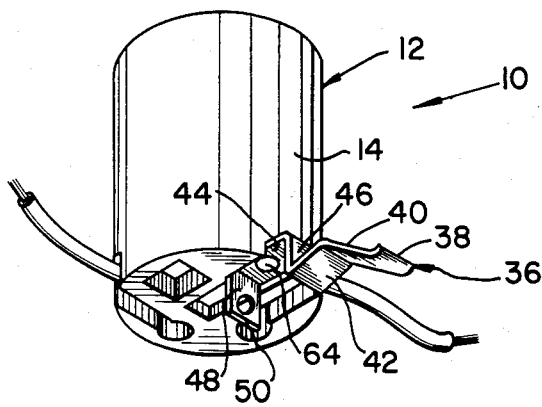
FIG. 1 is a perspective view of one aspect of the present invention, viewed relatively speaking from the bottom left vantage point if the clip is considered to be located at the front thereof.
Figure 2:
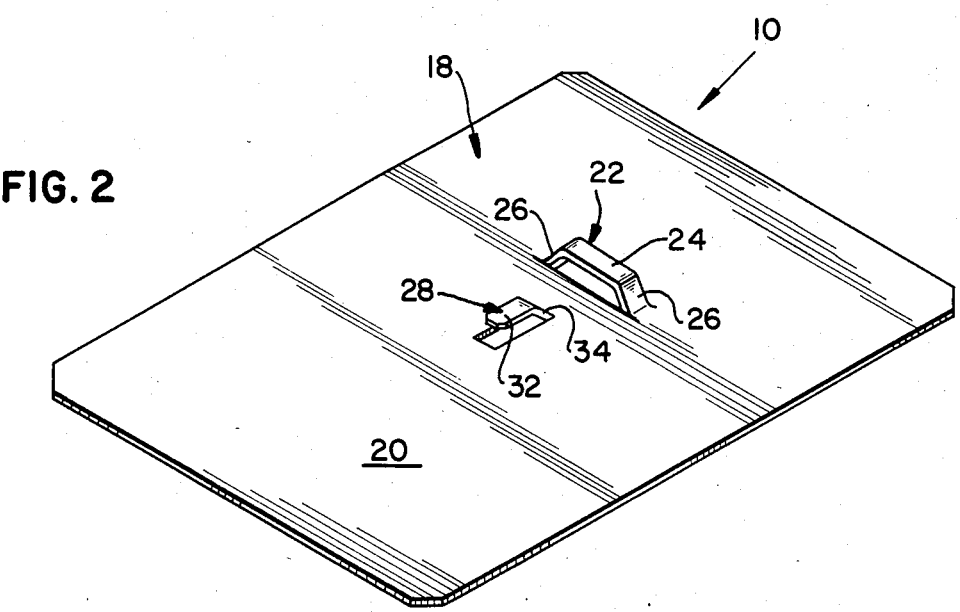
FIG. 2 is a perspective view of a portion of a mounting panel.
Figure 5:
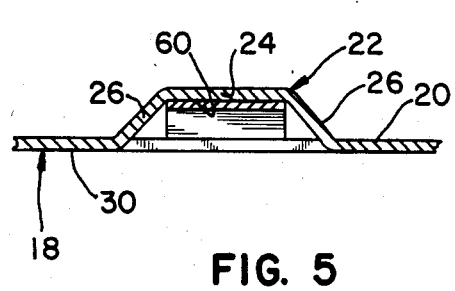
FIG. 5 is a sectional elevational view taken along line 5—5 of FIG. 4.
Figure 6:
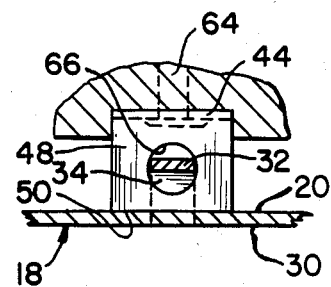
FIG. 6 is a sectional elevational view taken along line 6—6 of FIG. 4.
Figure 3:
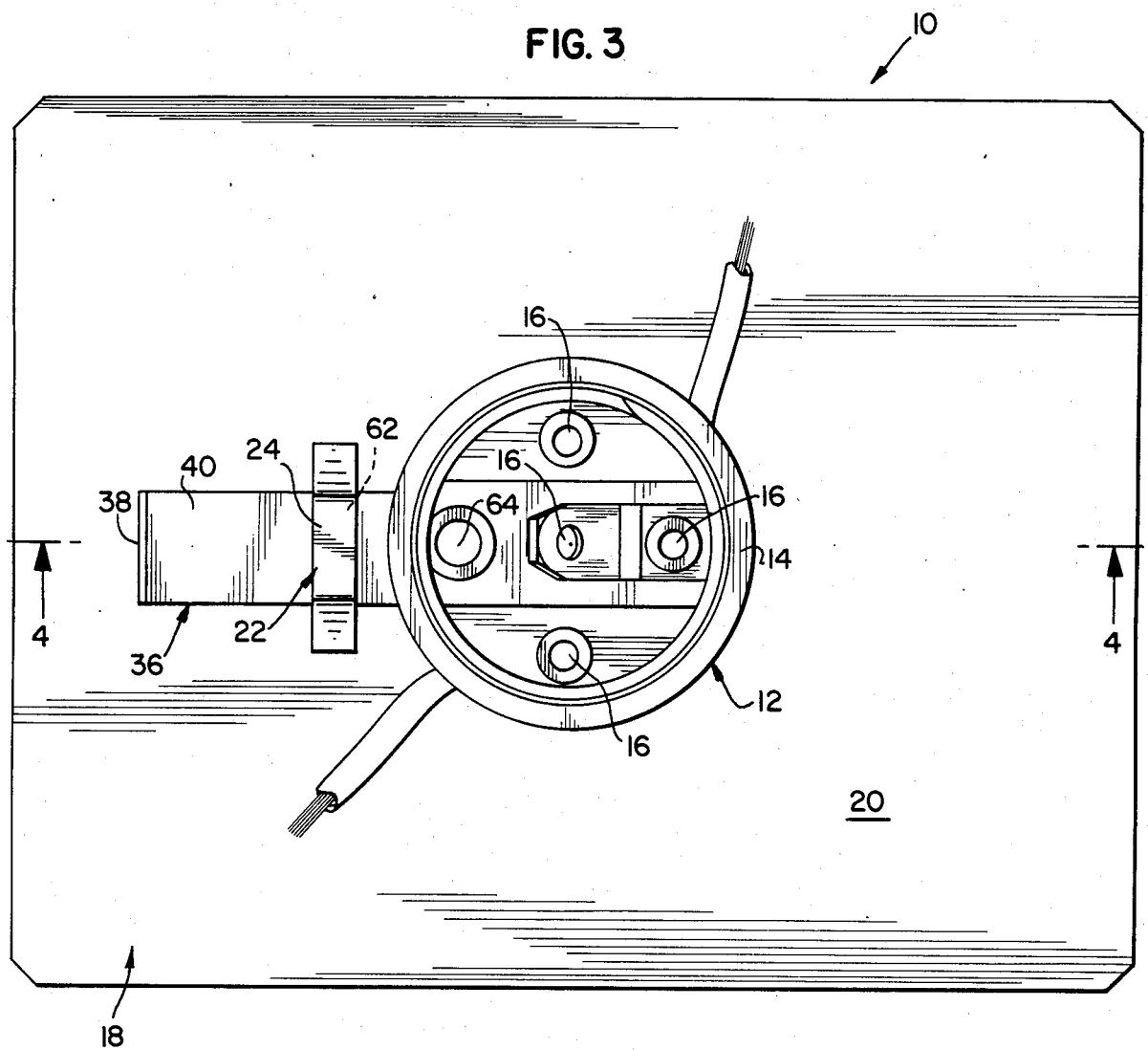
FIG. 3 is a top plan view of the present invention in its mounted condition, with the wiring device, in this case a lampholder, mounted to the mounting panel shown in FIG. 2.
Figure 4:
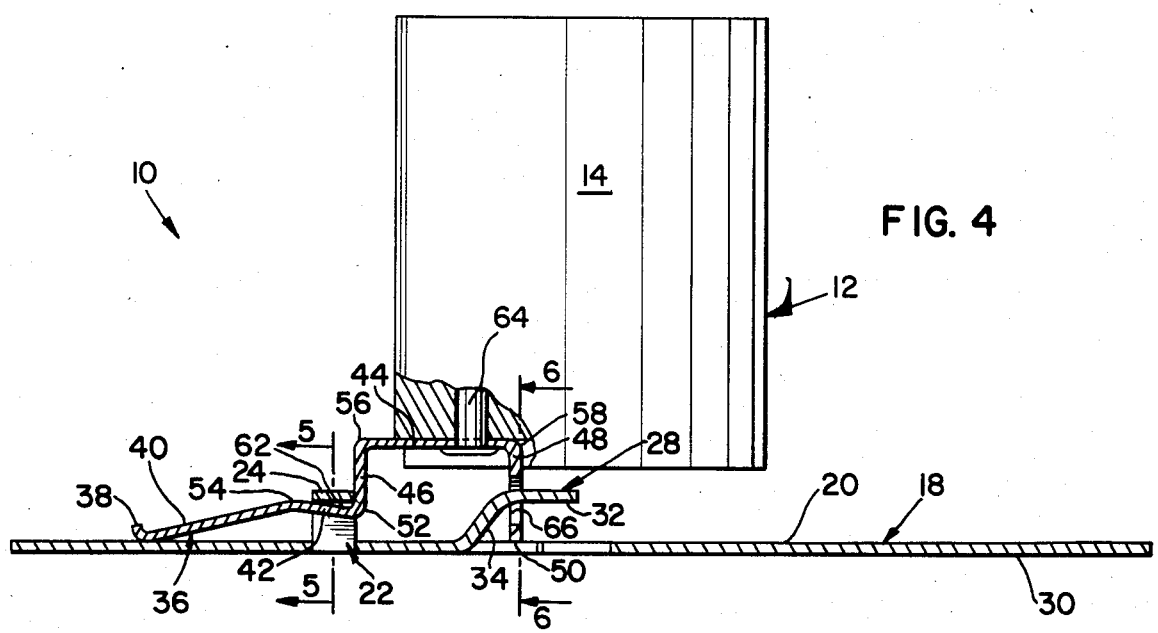
FIG. 4 is a sectional elevational view taken along line 4—4 of FIG. 3.

Referring now in more detail to the drawings, the mounting system 10 is shown to include a wiring device illustrated by way of example only as a lampholder or socket 12 consisting of a housing 14 in which electrical contacts 16 are supported for operative connection with a supply of power, not shown by means of wire leads or conductors. Power may be derived from a conventional receptacle by means of a plug at the end of a cordset, for example. The present invention contemplates the rapid mounting of one or a plurality of lampholders to a mounting panel 18 of a fixture, such as a multi-lamp ceiling fixture of the type used to illuminate a kitchen or bath area, by way of example.

Mounting panel 18 is formed with a relatively upper mounting surface 20 from which a mounting loop or lancing 22 protrudes 0.132 inch. The panel may be 0.031 inch and at this point in this specification it warrants express mention that any and all dimensions given are by way of example only and are not intended to limit the proper scope of the present invention. The overall length of lancing 22 may be 0.500 inch, with its flat portion 24 approximately 0.328 long and disposed equidistant between ramps 26 on either side thereof.

A locking tab 28 protrudes from panel 18 in the same direction as lancing 22, it being a goal of the present invention to provide no extensions or protrusions from or beneath underside surface 30 of panel 18. Locking tab 28 is formed with a locking arm 32 which extends substantially parallel with respect to mounting surface 20. Arm 34 of locking tab 28 integrally and resiliently joins locking arm 32 with surface 20.

A clip 36 is used to removably mount lampholder 12 to mounting panel 18. Clip 36 is formed in a novel shape which includes a curved and upturned end 38 which communicates continuously with ascending ramp 40 which, in turn, communicates with a descending ramp 42 which, in turn, is joined at substantially 90 degrees with a strap portion 44 by a vertical wall 46. Strap portion 44, in turn, terminates at substantially 90 degrees with depending locking wall 48 whose length is sufficient to have its end 50 extend beneath an acute angle juncture 52 of vertical wall 46 and descending ramp 42, but above the relative elevation of upturned end 38. Ascending ramp 40 and descending ramp 42 meet at juncture 54. Strap portion 44, in turn, extends between junctures 56 and 58.

When mounted, as will be described in more detail below, the centerline of the lampholder, for example, will lie approximately 0.750 inch from the centerline of lancing or loop 22, the width of lancing 22 being preferably 0.250 inch. Lancing 22 and its flat portion 24 is formed with a bearing surface 60 against which upper surfaces 62 of descending ramp 42 come to bear, in use. Clip 36 is preferably but not necessarily joined to lampholder 12 by means of a rivet 64, which may also serve as means of electrically forming a grounding path between the lampholder and the panel if desired. In the configuration and example illustrated in the drawings, no such electrical path is contemplated.

In use, the user wishing to mount the socket or lampholder 12 to the panel 18 simply grasps the socket to which the clip 36 is joined and inserts upturned end 38 of the clip 36 into and through the loop defined by lancing 22 until the ascending ramp 40 of clip 36 comes into contact with the lancing, whereupon further pushing or movement of the clip through lancing 22 will cause deflection of the clip until juncture 54 passes through the loop or lancing 22, whereupon further such movement is prevented by the presence of vertical wall 46, against which the lancing 22 comes to rest, with its bearing surface 60 of flat portion 24 in contact with and spring-biased against upper surfaces 62 of descending ramp 42.

The movement just described above in connection with clip 36 simultaneously results in entry of arm 34 of locking tab 28 into and through an opening 66 formed in locking wall 48 of clip 36, with end 50 preferably but not necessarily biased against surface 20 of mounting panel 18. With surfaces of arm 34 in contact with the clip surfaces which define opening 66, one can now see that a mounting system according to the present invention is provided which prevents sliding, rotation and lifting of the device being mounted, such as socket or lampholder 12.

The present invention also provides the user with a system that does away with the convention need to rivet or otherwise join the wiring device to the mounting panel, which has been a time consuming and relatively costly procedure.

Having thus described aspects of the present invention, what is desired to be protected by Letters Patent is presented in the subsequently apended claims whose scope and spirit is to conform with that of the foregoing.

What is claimed is:

1. An assembly mounting an electrical device on a panel, said assembly comprising:
    a housing, electrical contacts supported by said housing, electrical means interconnected with said housing for interconnecting power to said electrical contacts, and
    said panel includes an upper surface, a first bearing surface spaced above and opposite to the upper panel surface, a locking tab spaced above the upper panel surface and a second bearing surface on said locking tab opposite to the upper panel surface,
    clip means mounted to the housing, and
    having three spaced bearing surfaces on said clip means which mount said housing on said panel, and
    said clip means slidably inserted between the first panel bearing surface and said upper surface, and
    including a portion receiving the second panel bearing surface, and wherein
    no portion of said clip means extends below the panel upper surface, wherein said clip means formed with said three bearing surfaces comprises a resilient spring member.

2. An assembly according to claim 1, wherein said clip means is further formed with an opening therethrough receiving said locking tab.

3. An assembly according to claim 2, wherein the combination of said panel bearing surfaces, said locking tab, said clip means and its three bearing surfaces are so aligned so that when said clip means is located between the panel's first bearing surface and the panel upper surface, and is in receipt of the panel's second bearing surface they substantially prevent rotation, sliding and lifting of said housing with respect to said panel mounting surfaces.

4. An assembly according to claim 3, wherein said clip means is removable and reattachable to said panel's upper surface.

* * * * *